US012639516B2

(12) United States Patent
Shah et al.

(10) Patent No.: US 12,639,516 B2
(45) Date of Patent: May 26, 2026

(54) CLASSIFICATION AND AUGMENTATION OF UNSTRUCTURED DATA FOR AUTOFILL

(71) Applicant: Microsoft Technology Licensing, LLC, Redmond, WA (US)

(72) Inventors: Shrey Shah, Redmond, WA (US); Timothy Franklin, Seattle, WA (US); Irfan Ahmed, Hyderabad (IN); Bryan Miller, London (GB); Anand Balachandran, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 136 days.

(21) Appl. No.: 18/573,622

(22) PCT Filed: Jun. 10, 2022

(86) PCT No.: PCT/US2022/032926
§ 371 (c)(1),
(2) Date: Dec. 22, 2023

(87) PCT Pub. No.: WO2023/278124
PCT Pub. Date: Jan. 5, 2023

(65) Prior Publication Data
US 2024/0303434 A1     Sep. 12, 2024

(30) Foreign Application Priority Data
Jul. 1, 2021   (IN) .............................. 202141029629

(51) Int. Cl.
*G06F 40/274*      (2020.01)
*G06F 9/451*      (2018.01)
(Continued)

(52) U.S. Cl.
CPC ............ *G06F 40/274* (2020.01); *G06F 9/451* (2018.02); *G06F 40/35* (2020.01); *G06V 30/19173* (2022.01)

(58) Field of Classification Search
CPC ........ G06F 40/274; G06F 9/451; G06F 40/35; G06F 40/30; G06V 30/19173
See application file for complete search history.

(56) References Cited

U.S. PATENT DOCUMENTS

| 7,426,496 | B2 | 9/2008 | Kristjansson |
| 8,600,931 | B1 | 12/2013 | Wehrle et al. |

(Continued)

FOREIGN PATENT DOCUMENTS

| WO | 2018222776 A1 | 12/2018 |
| WO | 2019103738 A1 | 5/2019 |

OTHER PUBLICATIONS

International Search Report and Written Opinion Issued in PCT Application No. PCT/US22/032926, Sep. 23, 2022, 9 pages.

(Continued)

*Primary Examiner* — Athar N Pasha

(57) ABSTRACT

In non-limiting examples of the present disclosure, systems, methods and devices for classifying text strings, augmenting text strings, and identifying classified text strings for intelligent autofill are provided. A fact store may be populated with facts from a plurality of data sources associated with a user account. The fact store may comprise unstructured data, semi-structured data, and structured data. An intent type associated with a text string displayed by a local computing device may be determined. The text string may comprise form data or freeform data. A context associated with the local computing device may also be determined. Based on (Continued)

the intent type and the context, a text string corresponding to a fact in the fact store may be identified for surfacing on the local computing device.

20 Claims, 10 Drawing Sheets

(51) Int. Cl.
  *G06F 40/35* (2020.01)
  *G06V 30/19* (2022.01)

(56) References Cited

U.S. PATENT DOCUMENTS

| 9,785,717 B1* | 10/2017 | DeLuca ................ G06F 16/248 |
| 9,805,371 B1 | 10/2017 | Sapoznik et al. |
| 10,635,748 B2 | 4/2020 | Liu et al. |
| 2009/0199115 A1* | 8/2009 | Singh .................... G06F 16/904 |
| | | 707/999.005 |
| 2009/0249183 A1 | 10/2009 | Oates et al. |
| 2010/0162178 A1* | 6/2010 | Tuli ...................... G06F 3/0346 |
| | | 345/173 |
| 2018/0349447 A1* | 12/2018 | Maccartney ...... G06F 16/24578 |
| 2020/0133970 A1* | 4/2020 | Khabiri .................. G06N 3/045 |
| 2020/0226209 A1 | 7/2020 | Baysinger et al. |
| 2021/0327413 A1* | 10/2021 | Suwandy .............. G06N 3/045 |
| 2021/0350209 A1* | 11/2021 | Wang ...................... G06N 3/08 |

OTHER PUBLICATIONS

Kristjansson, et al., "Interactive Information Extraction with Constrained Conditional Random Fields", In Proceedings of the Nineteenth National Conference on Artificial Intelligence, Jul. 25, 2004, pp. 412-418.

Toda, et al., "A Probabilistic Approach for Automatically Filling Form-Based Web Interfaces", In Proceedings of the VLDB Endowment, vol. 4, Issue No. 3, Aug. 29, 2011, pp. 151-160.

Winckler, et al., "An Approach and Tool Support for Assisting Users to Fill-in Web Forms with Personal Information", In Proceedings of the 29th ACM International Conference on Design of Communication, Oct. 3, 2011, pp. 195-202.

* cited by examiner

START | Search | O ▦ ▤ ⬜ | ▭ ⓕ 3:35PM

104

106

Device input reporting engine
108

Local context analysis engine
109

Service store

128   130

User data
122

126   124

Application data
123

120

Network and processing

NETWORK
112

114

110

Autofill service

Context analysis engine
134

Data normalization engine
136

NLP models
138

Text prediction engine
140

Embedding engine
142

Data retrieval APIs
144

Intent determination engine
146

Text candidate ranking engine
148

132

Factual data stores

Factual data store (group)
152

Factual data store (user)
154

150

111

Start

Apply context analysis engine to user interface _502

Identify current context _504

Receive natural language input _506

Apply NLP model to natural language input _508

Determine intent type of natural language input _510

Identify textual data for completing or responding to the natural language input _512

Causing the identified textual data to be displayed _514

End

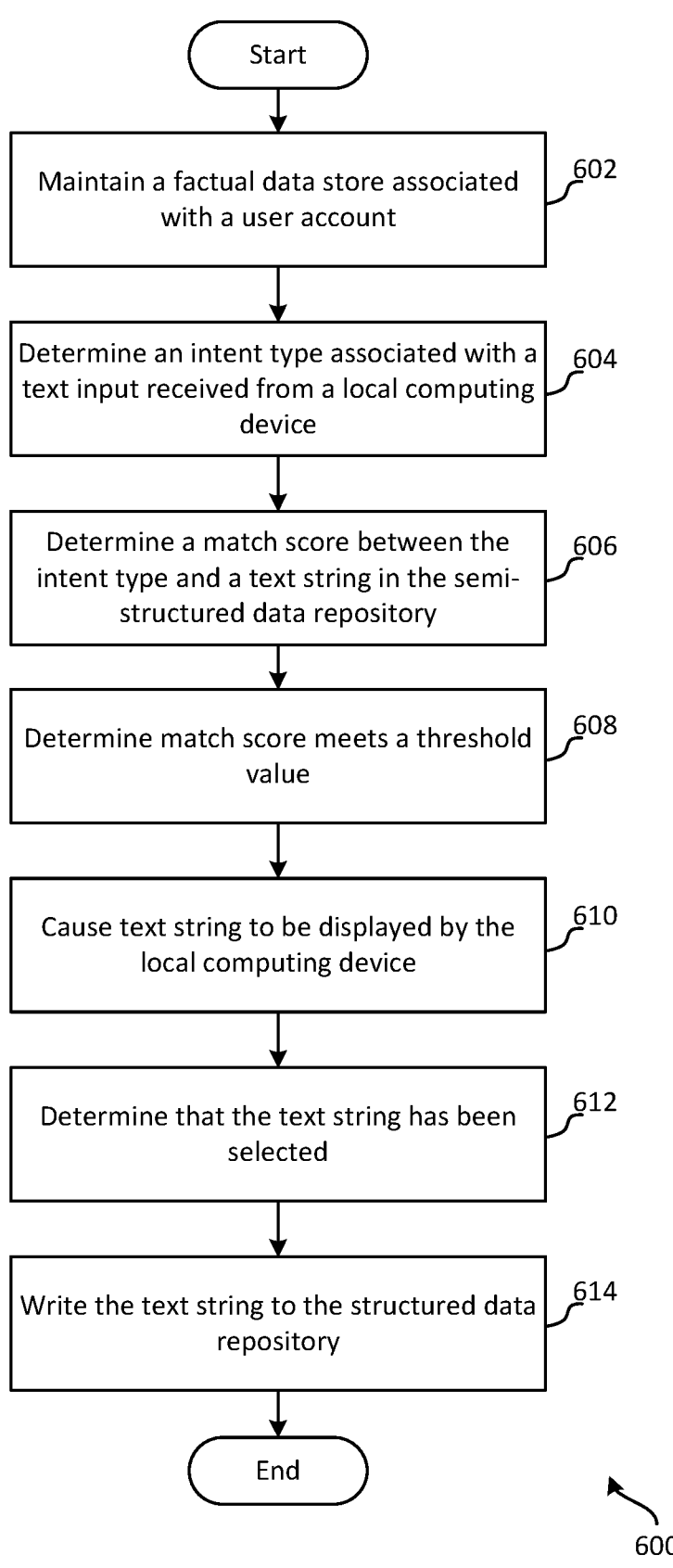

Start

Maintain a factual data store associated with a user account  602

Determine an intent type associated with a text input received from a local computing device  604

Determine a match score between the intent type and a text string in the semi-structured data repository  606

Determine match score meets a threshold value  608

Cause text string to be displayed by the local computing device  610

Determine that the text string has been selected  612

Write the text string to the structured data repository  614

End

600

CLASSIFICATION AND AUGMENTATION OF UNSTRUCTURED DATA FOR AUTOFILL

CROSS REFERENCE TO RELATED APPLICATIONS

This application is a national stage entry under 35 U.S.C. 371 of International Application No. PCT/US2022/032926, filed Jun. 10, 2022, titled "CLASSIFICATION AND AUGMENTATION OF UNSTRUCTURED DATA FOR AUTOFILL," which claims priority to India Patent Application No. 202141029629, filed Jul. 1, 2021, titled "CLASSIFICATION AND AUGMENTATION OF UNSTRUCTURED DATA FOR AUTOFILL," each of which are incorporated by reference in their entireties for all purposes.

BACKGROUND

Text prediction and autofill systems have become a useful tool for efficiently filling out forms and drafting documents and messages. However, text prediction systems are limited in that they are typically not able to predict facts that are specific to a user, which may be determined from many disparate sources. Similarly, although autofill systems may identify and surface facts that are specific to a user when keywords like "password" and "phone number" are identified in an electronic form, those systems do not surface user-specific facts in free-form text environments (e.g., document creation, message drafting). Traditional autofill systems are also deficient in that they do not take a current local device context into consideration when surfacing autofill candidates.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the disclosure provide systems, methods, and devices for classifying text strings, augmenting text strings, and identifying classified text strings for intelligent autofill. According to a first example, a computer-implemented method is provided. The computer-implemented method comprises: applying, by a local computing device, a context analysis engine to a user interface connected to the local computing device; identifying, with the context analysis engine, a current context on the local computing device; receiving, by the local computing device, a natural language input; applying a natural language processing model that has been trained to classify natural language into intent type classifications to the natural language input; determining, based on the application of the natural language processing model and the current context on the local computing device, an intent type of the natural language input; identifying textual data for completing or responding to the natural language input that meets a threshold match score for the intent type, wherein the textual data is identified in a factual data store associated with a user account signed into the local computing device; and causing the identified textual data to be displayed on the user interface of the local computing device.

According to an additional example, a system is provided. The system comprises a memory for storing executable program code; and a processor, functionally coupled to the memory, the processor being responsive to computer-executable instructions contained in the program code and operative to: apply, by a local computing device, a context analysis engine to a user interface connected to the local computing device; identify, with the context analysis engine, a current context on the local computing device; receive, by the local computing device, a natural language input; apply a natural language processing model that has been trained to classify natural language into intent type classifications to the natural language input; determine, based on the application of the natural language processing model and the current context on the local computing device, an intent type of the natural language input; identify textual data for completing or responding to the natural language input that meets a threshold match score for the intent type, wherein the textual data is identified in a factual data store associated with a user account signed into the local computing device; and cause the identified textual data to be displayed on the user interface of the local computing device.

According to another example, a computer-readable storage device is provided. The computer-readable storage device comprises executable instructions that, when executed by a processor, assist with surfacing autofill text strings, the computer-readable storage device including instructions executable by the processor for: maintaining a factual data store associated with a user account, wherein the factual data store comprises: a semi-structured data repository comprising a first plurality of text strings, wherein each of the first plurality of text strings is associated in the semi-structured data repository with a plurality of text embeddings, and a structured data repository comprising a second plurality of text strings, wherein each of the second plurality of text strings is associated in the structured data repository with at least one field corresponding to a fact type; determining an intent type associated with a text input received from a local computing device; determining a match score between the intent type and a text string of the first plurality of text strings in the semi-structured data repository; determining that the match score meets a threshold value; causing the text string to be displayed by the local computing device; determining that the text string has been selected; and writing the text string to the structured data repository.

BRIEF DESCRIPTION OF THE DRAWINGS

Non-limiting and non-exhaustive examples are described with reference to the following figures:

FIG. 1 is a schematic diagram illustrating an example distributed computing environment for classifying text strings, augmenting text strings, and identifying classified text strings for intelligent autofill.

FIG. 6 is an exemplary method for assisting with surfacing autofill text strings.

DETAILED DESCRIPTION

Figure 2:
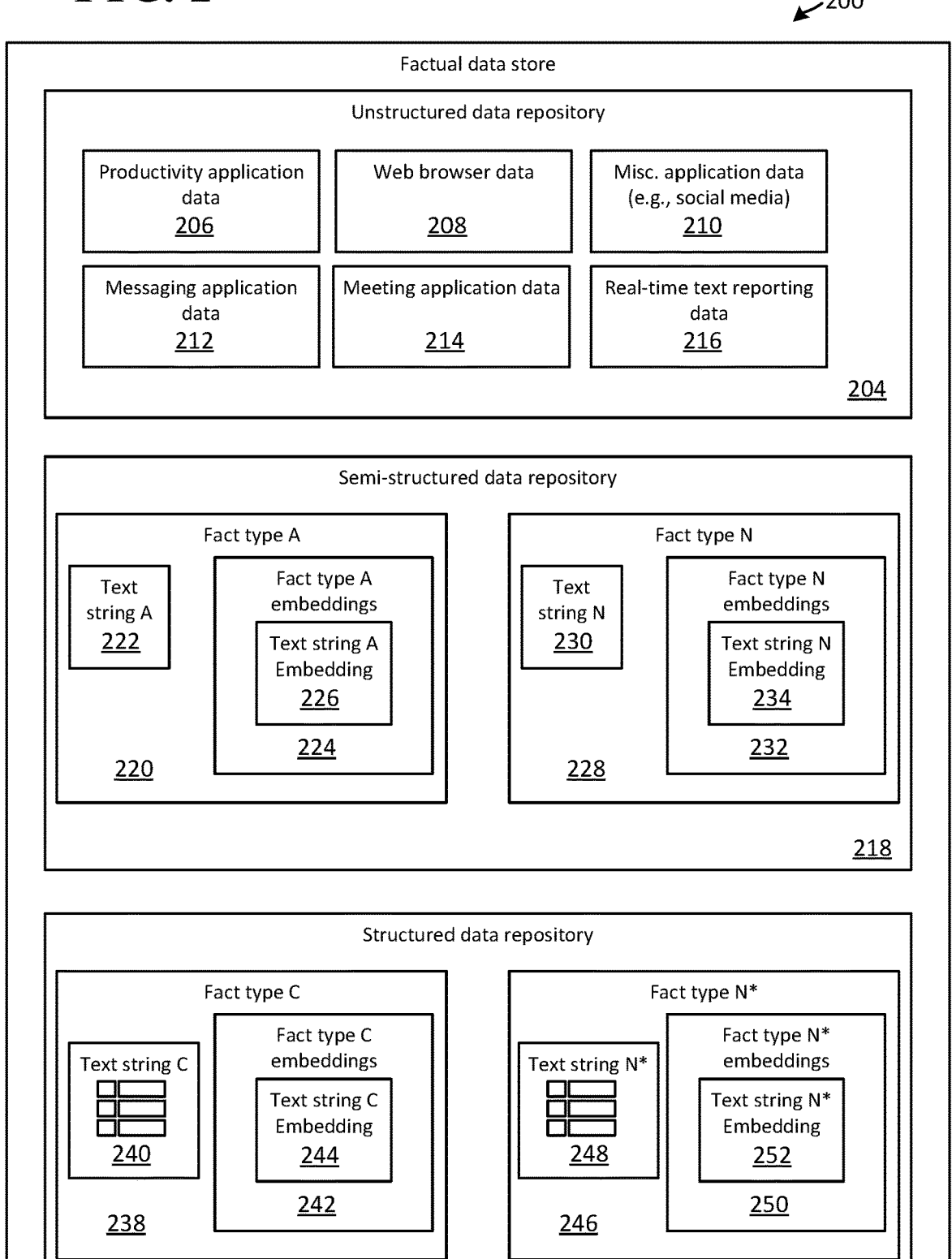
FIG. 2 is a block diagram illustrating an exemplary factual data store.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for classifying text strings, augmenting text strings, and identifying classified text strings for intelligent autofill. The text strings that are classified, augmented, and identified for intelligent autofill may comprise facts that have been identified from a variety of sources associated with a user account. As described herein, a "fact" describes information that is specific to a user (e.g., a user account) or a group of users (e.g., group of user accounts). Examples of facts include passwords, confirmation numbers, bank account information, dates associated with users (e.g., birth dates, travel dates), locations associated with users (e.g., addresses, travel locations, airport names), and any other information that may relate specifically to a user or group of users. Facts for groups of users may comprise enterprise facts (e.g., facts associated with a company or a set of user accounts in a company) or custom group facts (e.g., a set of facts associated with a plurality of family member accounts, a set of facts associated with a plurality of friend accounts).

Examples described herein provide techniques for augmenting the classification of unstructured data into structured well known personal information entities, or facts. An autofill service may receive data from a variety of sources associated with a user account. The autofill service may extract facts from that data, which may then be subsequently confirmed for use in association with various intents and contexts via user input. Those facts may be stored in a semi-structured database and surfaced when an intent that matches a fact is determined. When a confirming user input is received in relation to a fact, the fact may then be moved to a structured database where it may be associated with one or more classifications. The facts may be surfaced for use in filling out forms, for use in responding to messages, and/or for use in drafting documents or messages (e.g., via predictive text).

In examples, a confidence score may be associated with semi-structured facts, where the confidence score corresponds to a likelihood that a fact relates to a specific fact type. A confidence score for a semi-structured fact may change over time based on one or more other pieces of data. That is, a confidence score that a first semi-structured fact corresponds to a specific fact type may increase based on being associated with one or more related semi-structured facts. Once a confidence score for a semi-structured fact meets or exceeds a threshold value, it may be classified as structured data. As a specific example, if in a text conversation a user states "Hey don't forget to send me your info" and a second user replies with a flight tracking number "ASA1414", the system may generate a first confidence score that ASA1414 corresponds to a flight tracking number. The first confidence score may be relatively low because the format of ASA1414 may correspond to a variety of code types, such as passwords, locker combinations, hotel booking codes, and flight tracking numbers. However, if the system has access to another semi-structured fact for the user account (e.g., an email or text with "Alaska Air to SFO" in it) but that semi-structured fact doesn't include passenger information, the two facts may be combined into structured data. Thus, the confidence score for the semi-structured fact corresponding to the flight tracking number may be increased based on the semi-structured fact corresponding to the email or text including "Alaska Air to SFO".

The autofill service may identify intents associated with text, which may be utilized by the service to identify relevant facts to surface. In identifying intents, the autofill service may apply a variety of natural language processing models and a variety of context analysis models. In some examples, the natural language processing models and/or the context analysis models may be executed on the local computing device and/or in the cloud. At least a portion of the processing may be performed locally due to a lack of access to textual or contextual information, due to privacy concerns, and/or due to settings associated with one or more applications, services, or devices.

The systems, methods, and devices described herein provide technical advantages for classifying text strings, augmenting text strings, and identifying classified text strings for intelligent autofill. The mechanisms described herein provide for the processing of contextual data on local and remote devices to identify text and context information that may be utilized to determine intent types that are useful in identifying relevant facts to surface for text prediction and autofill purposes. Mechanisms described herein provide the ability to identify facts from a variety of data sources associated with a user account, normalize that data, and augment those facts with embeddings that may be utilized to match them to intents in both freeform and form fill contexts. Once those facts are confirmed to apply to specific intents and/or contexts they may be further augmented and stored in a more structured format for even more accurate and useful surfacing.

FIG. 1 is a schematic diagram illustrating an example distributed computing environment 100 for classifying text strings, augmenting text strings, and identifying classified text strings for intelligent autofill. Distributed computing environment 100 includes local device sub-environment 102 and service sub-environment 111.

Local computing device sub-environment 102 includes mobile computing device 104, client computing device 106, device input reporting engine 108, and local context analysis engine 109. Service sub-environment 111 includes network and processing sub-environment 110, service store 120, autofill service 132, and factual data stores 150. Although some of the operations, engines, models, and stores are primarily described in relation to either local computing device sub-environment 102 or service sub-environment 111, any of those operations, engines, models, and/or stores may be executed and/or maintained entirely locally, entirely remotely (e.g., cloud based), and/or partially locally and partially remotely.

Network and processing sub-environment 110 includes network 112 and server computing device 114. Network 112 may comprise a wired or wireless network. Any and all of the computing devices described herein may communicate with one another via a network, such as network 112. Server computing device 114 is illustrative of one or more server computing devices that may host the services and stores described herein. For example, server computing device 114 may host service store 120, autofill service 132, and/or factual data stores 150.

Service store sub-environment 120 may include information associated with autofill service 132 and/or one or more other applications or services. For example, service store sub-environment 120 may include application data associated with a plurality of applications. The application data may be stored in application data store 123. The aggregate information for a plurality of users associated with a productivity application suite and/or one or more other applications may be included in application data store 123. User data (e.g., account identifiers, user preferences, passwords) may be stored in user data store 122. In some examples, user data store 122 and application data store 123 may be comprised in a same data store.

User data store 122 may be associated with a plurality of user accounts, such as user account 124. User account 124 may have granted autofill service 132 with access to the user's application data. User account 124 may additionally or alternatively be associated with one or more productivity application services. In this example, user account 124 is associated with an email application service, a word processing application service, and a calendar application service. As such, service store 120 includes electronic messages 128 associated with user account 124, electronic documents 126 associated with user account 124, and electronic calendar information 130 associated with user account 124. User data store 122 may include additional information from one or more other applications or services, such as SMS messaging applications or services, group messaging/collaboration applications or services, social media applications or services, web browser applications or services, task management applications or services, to-do list applications or services, map applications or services, reservation applications or services, presentation applications or services, and spreadsheet applications or services, for example. In some examples, user data store 122 may include information for user accounts associated with autofill service 132.

Autofill service 132 includes context analysis engine 134, data normalization engine 136, natural language processing (NLP) models 138, text prediction engine 140, embedding engine 142, data retrieval application programming interfaces (APIs) 144, intent determination engine 146, and text candidate ranking engine 148. Autofill service 132 may perform operations associated with classifying text strings, augmenting text strings, and identifying classified text strings for intelligent autofill.

Autofill service 132 may utilize data retrieval APIs 144 to retrieve data associated with one or more user accounts. For example, data retrieval APIs 144 may be utilized to communicate and interact with any of the applications or services included in service store 120. In some examples, autofill service 132 may utilize a different API to communicate with each application or service. In other examples, autofill service 132 may utilize a single API to retrieve data from service store 120. Data retrieval APIs 144 may be utilized by autofill service 132 to retrieve electronic documents, electronic messages, transcribed voice notes (e.g., speech-to-text), web browser search history data, data input into electronic forms, data entered into an electronic calendar, and/or any other electronic data generated by or associated with a user account. While in this example, data retrieval APIs 144 are utilized by autofill service 132 to retrieve data associated with user accounts, in other examples a reporting system associated with service store 120 may provide data associated with user accounts to autofill service 132.

Autofill service 132 may also receive input data from local computing devices (e.g., mobile computing device 104, client computing device 106) via device input reporting engine 108. In examples, a user associated with a local computing device may have to affirmatively opt in for device input reporting engine 108 to collect input data and/or send input data to one or more services. Device input reporting engine 108 may receive keystroke inputs from a keyboard (e.g., a physical keyboard, a virtual keyboard) connected to a local computing device and send that data to autofill service 132. Thus, the keystroke input data may be transformed into text data that may be processed by autofill service 132.

Data normalization engine 136 may be applied to the data retrieved from service store 120. Data normalization engine 136 may apply normalization rules to generate a normalized set of content from service store 120. For example, data retrieved from service store 120 may be received in a plurality of formats, and data normalization engine 136 may normalize it to a single format, or at least fewer formats than the data was received in. For example, text data retrieved from service store 120 may be included in a plurality of formats (e.g., .DOC, HTML, .TXT, .RTF, .PDF) and a plurality of files depending on the applications that generated that text data. The text data may be transformed by data normalization engine 136 to a single format, or fewer formats, and stored in one or more formats (e.g., a flat file format, a relational database format). In some examples, data normalization engine 136 may break large text strings into sets of smaller text strings for processing. In examples, the normalized text data may be stored in an unstructured data repository in one or more factual data stores 150.

NLP models 138 may comprise keyword matching models, key phrase matching models, and/or text embedding models, for example. NLP models 138 may comprise one or more NLP models that have been trained to identify text strings that correspond to fact types (e.g., address fact type, phone number fact type, password fact type, travel fact type) that are stored in factual data stores 150. Thus, NLP models 138 may be utilized to identify facts that are included in text data received from service store 120 and/or device input reporting engine 108. The identified facts may then be associated (e.g., with metadata, with a classification tag) with corresponding fact types. Text strings corresponding to the identified facts may be stored in a semi-structured data repository in factual data stores 150.

NLP models 138 may also comprise one or more NLP models that have been trained to identify text strings that correspond to intent types for facts. For example, when a text string is identified on a local computing device, NLP models 138 may process that text string to determine whether it corresponds to a "provide address" intent type, a "provide password" intent type, or a "provide flight details" intent type. These are simply examples of intent types for facts, and it should be understood that many other different intent types for facts are contemplated. In some examples, NLP models 138 may generate a plurality of scores for a text string, where each score corresponds to a confidence that the text string matches a corresponding intent type for a fact. In some examples, text candidate ranking engine 148 may rank each text string-intent type pair based on a corresponding score.

Local context analysis engine 109 and context analysis engine 134 both process context data to determine a current context on a local computing device. However, local context analysis engine 109 performs the processing on the local computing device where the context data is generated, and context analysis engine 134 performs the processing in the cloud. Context data may comprise data generated or accessed by a local computing device that provides an indication of an activity or intent type that a user is engaging in on the local computing device. Thus, context data may comprise text data, voice input data, image data, application data, and/or operating system interaction data.

In some examples, due to privacy settings or concerns, the sensitive nature of context data, and/or limited access to specific types of context data, only local context analysis engine 109 may have access to certain context data. For example, local context analysis engine 109 may have access to image data from a messaging application that includes text in it, but context analysis engine 134 may not have access to that data because the messaging application may not provide cloud-based API access to that data (or the underlying metadata). Local context analysis engine 109 may apply an optical character recognition (OCR) engine to that image data to identify and extract the underlying text. As another example, settings associated with a web browser application or service may dictate that a cloud service is not provided with browsing history data for the web browser application or service. In some examples, the local system may not have access to the search inputs, metadata, and/or HTML data associated with a web browsing session, but the local computing device may still process web browser context data for a browsing session (assuming a user account has opted in via privacy settings) utilizing pixel and/or image data from displayed webpages. Local context analysis engine 109 may apply an OCR engine to that pixel data to identify and extract underlying text. In additional examples, local context analysis engine 109 may apply one or more image neural networks to the pixel data to classify or identify text, images, and/or website and webpage types. Thus, local context analysis engine 109 may process context data that is otherwise inaccessible to context analysis engine 134.

In addition to the OCR engine and the image neural networks described above, local context analysis engine 109 and/or context analysis engine 134 may comprise website classification models (e.g., HTML classification models, webpage tag classification models, webpage domain classification models, webpage header classification models) text classification models (keyword or phrase classification models, embedding classification models, sent-2-vec, Bidirectional Encoder Representations from Transformers [BERT], Embeddings from Language Model [ELMo]), and/or accessibility data classification models.

When a text input is received (e.g., by a local computing device, by autofill service 132 from a local computing device), a determination may be made as to an intent type associated with the natural language input. To determine the intent type, a first score may be determined by NLP models 138 and a second score may be determined by context analysis engine 134 and/or local context analysis engine 109. Those scores may be combined (e.g., added, transformed) to determine a combined intent type score corresponding to the natural language input and the current context of the local computing device. For example, NLP models 138 may receive text entered on or included in a messaging application, a document, or a website, and a first score corresponding to a likelihood that the text corresponds to an intent type (e.g., insert address, insert home address, insert work address, provide password, provide streaming service password, provide specific streaming service password, provide flight number, provide flight landing time, provide flight landing time for specific flight) may be determined. One or both of context analysis engine 134 and/or local context analysis engine 109 may process context data and determine a second score corresponding to a likelihood that a current context of the local computing device corresponds to one of the intent types. Those first and second scores may be combined into a combined intent type score.

Once the scores are combined, a determination may then be made by autofill service 132 as to a text string in factual data stores 150 that most closely matches the combined intent type score. That is, a match score may be determined between a plurality of text strings, or embeddings for texts strings, and the combined intent type score. The text strings or embeddings for the text strings that the match scores are determined for may be included in a factual data store associated with a user account that is logged into the local computing device. If the match score for one or more text strings or embeddings for one or more text strings meets or exceeds a threshold match score, the one or more text strings, or portions of the one or more text strings that match the intent and context, may be displayed by the local computing device. In some examples, only a text string with a highest match score may be displayed. The displayed one or more text strings may be selectable for inserting in an application, document, or operating system shell element where the received text input was received by the local computing device.

Factual data stores 150 includes group factual data store 152 and single user factual data store 154. Single user factual data store 154 may store text data and text embeddings for text data that may be utilized by autofill service 132 to autofill electronic surfaces (e.g., electronic forms, electronic messages, electronic documents, search bars) in association with a single user account. That is, a user account may provide autofill service 132, via one or more settings, with access to factual data (e.g., text data, classifications related to text data) and designate that it only be utilized by autofill service 132 for populating text content in surfaces that are accessed by that user account. That data may be stored in single user factual data store 154. Alternatively, a user account may provide autofill service 132, via one or more settings, with access to factual data (e.g., text data, classifications related to text data) and designate that it may be utilized by autofill service 132 for populating text content in surfaces that are accessed by that user account and/or one or more other designated user accounts or user account types (e.g., enterprise account types, types defined by tenancy rules, family user accounts). That data may be stored in group factual data store 152. In some examples, a user account may designate types of facts that may only be accessed by a single user account or by a plurality of user accounts. In additional examples, rather than maintaining separate group and single user data stores, autofill service 132 may maintain a single factual data store that provides single user and group access to data based on one or more account settings.

Group factual data store 152 and single user factual data store 154 may each include an unstructured data repository, a semi-structured data repository, and a structured data repository. The unstructured data repository may comprise raw (e.g., unmodified) or normalized text content from any of the sources described in relation to service store 120 and/or device input reporting engine 108. The semi-structured data repository may comprise a plurality of text strings that are each associated in the semi-structured data repository with at least one text embedding. The structured data repository may comprise a plurality of text strings that are each associated in the structured data repository with at least one fact type. Each of the plurality of text strings in the structured data repository may also be associated in the structured data repository with one or more embeddings. The plurality of text strings in the structured data repository may also be associated in the structured data repository with one or more factual classifications and/or local device context types. Additional details regarding the unstructured data repository, the semi-structured data repository, and the structured data repository are provided below in relation to FIG. 2.

In examples where autofill service 132 is analyzing an active text input (e.g., a text input that is in the process of being entered, a user-provided text input that is in a currently active application window), text prediction engine 140 may generate one or more candidate text strings for completing the active text input. Text prediction engine 140 may comprise a neural model or an n-gram model. A predictive text neural model may receive a text input from an electronic surface (e.g., an application surface, a service surface, an operating system shell surface, a file surface) and generate one or more surfacing candidates based on processing the text input with the one or more neural network models. The surfacing candidates that are generated by a predictive text neural model may comprise one or more text characters, words, or punctuation that are determined to have at least a threshold likelihood of being selected by a user for following a text input. Examples of neural models that a predictive neural model may encompass include Generative Pre-Trained Transformers (GPT) (e.g., GPT2, GPT3), Bidirectional Encoder Representations from Transformers (BERT), Embeddings from Language Models (ELMo), and/or Recurrent Neural Networks (RNN). A predictive text n-gram model may receive a text input from an electronic surface and generate one or more surfacing candidates based on processing the text input with the n-gram model (e.g., 2-gram, 3-gram, 4-gram). The surfacing candidates that are generated by a predictive text n-gram model may comprise one or more text characters, words, or punctuation that are determined to have at least a threshold likelihood of being selected by a user for following the text input.

Text candidate ranking engine 148 may apply a set of rules to text strings in factual data stores 150 and text strings generated by text prediction engine 140 to determine which text strings to surface in relation to a received text input. The one or more rules may dictate that a text string with a highest match score be surfaced. In other examples, one or more rules may dictate that all text strings with a match score over a specific threshold value be surfaced. In other examples, one or more rules may dictate that X number of text strings with highest match scores be surfaced. In additional examples, one or more rules may dictate that a text string in the structured data repository with a match score over a threshold value may be surfaced even if a match score for a text string determined by text prediction engine 146 has a higher match score. In additional examples, a text candidate generated by text prediction engine 140 may be combined with at least a portion of factual text string (e.g., a text string in factual data stores 150), and the combined text string may be scored for ranking by candidate ranking engine 148.

FIG. 2 is a block diagram 200 illustrating an exemplary factual data store 202. Factual data store 202 provides one example of what a factual data store in factual data stores 150 may comprise. Factual data store 202 may be associated with or included in autofill service 132 and/or service store 120. Factual data store 202 includes unstructured data repository 204, semi-structured data repository 218, and structured data repository 236.

Unstructured data repository 204 may comprise unmodified or modified (e.g., normalized) text content from any of the sources described in relation to service store 120 and/or device input reporting engine 108. In the illustrated example, unstructured data repository 204 incudes productivity application data 206, web browser data 208, miscellaneous application data 210, messaging application data 212, meeting application data 214 and real-time text reporting data 216.

Productivity application data 206 may include documents generated or associated with productivity applications, and/or text entered into productivity applications or services. Exemplary productivity applications include word processing applications, spreadsheet applications, presentation applications, task management applications, map applications, note taking applications, and email applications, among others.

Web browser data 208 may include text data input into web browser applications, text data on or included in HTML of webpages accessed by web browser applications, web searches input into web browser applications, tags included in webpages accessed by web browser applications, and images of or included in webpages accessed by web browser applications.

Miscellaneous application data 210 may include documents generated or associated with applications (or services), and/or text entered into applications (or services) that may not be included in productivity application data 206. For example, miscellaneous application data 210 may include data included in or input into social media applications and services, game applications and services, and/or educational applications or services.

Messaging application data 212 may include text or image data input into or received by messaging applications or services. Messaging applications may include group communication applications, email applications, and/or SMS messaging applications, for example.

Meeting application data 214 may comprise text or image content that has been entered into or received by meeting applications or services. In some examples, meeting application data 214 may comprise speech-to-text data that has been transcribed by a speech-to-text engine.

Real-time text reporting data 216 comprises text data that has been received via device input reporting engine 108. That is, real-time text reporting data 216 may comprise text data generated from keystroke inputs form a keyboard (e.g., a physical keyboard, a virtual keyboard) connected to a local computing device.

Semi-structured data repository 218 may comprise a plurality of text strings that are each associated in semi-structured data repository 218 with at least one text embedding. For example, text strings for fact types may be manually identified and embeddings for those fact types may be generated and included in a fact type embedding matrix. Embeddings for text strings in unstructured data repository 204 may be generated and associated with one or more closest fact type embeddings in semi-structured data repository 218. In other examples, keyword or phrase matching models may be utilized to associate text strings from unstructured data repository 204 with fact types in semi-structured data repository 218. In some examples, a fact type may be associated with a text string in semi-structured data repository 218 via metadata, a fact type tag, and/or a header, for example. In this specific example, semi-structured data repository 218 includes fact type A 220, which includes text string A 222, fact type A embeddings 224, and text string A embeddings 226. Semi-structured data repository 218 also includes fact type N 228, text string N 230, fact type N embeddings 232, and text string N embedding 234.

Fact type A 220 may comprise a fact type that has been manually identified and included as a fact type in semi-structured data repository 218. Examples of fact types include address fact types, phone number fact types, password fact types, and travel fact types, among many others. In other examples, fact type A 220 may comprise a fact type that has been automatically identified via a trained machine learning model. Text string A 222 may have been extracted from one or more of the sources included in unstructured data repository 204. Text string A 222 has been classified as being of fact type A 220. That classification and/or determination may have been performed by NLP models 138 as described above in relation to FIG. 1. Text string A 222 may be associated with fact type A 220 in semi-structured data repository 218 with metadata, a fact type tag, and/or a header, for example. In this example, an embedding has been generated for text string A 222, as illustrated by text string A embedding 226, which is included with other text embeddings (fact type A embeddings 224) for fact type A 220. Fact type A embeddings 224 may be utilized for matching text inputs received in documents, forms, applications, or services to text inputs in semi-structured data repository 218 for autofill of those surfaces.

Fact type N 228, text string N 230, fact type N embeddings 232, and text string N embedding 234 simply illustrate that there are a plurality of fact types, text inputs, and corresponding text embeddings that may be included in semi-structured data repository 218. For example, fact type A 220 may correspond to an address fact type and fact type N may correspond to a phone number fact type, a drivers license number fact type, or a password fact type.

Structured data repository 236 may comprise a plurality of text strings that are each associated in structured data repository 236 with at least one fact type. Each of the plurality of text strings in structured data repository 236 may also be associated in structured data repository 236 with one or more embeddings. The text strings, associated fact types, and embeddings corresponding to a text string, from semi-structured data repository may be moved to (e.g., written to) structured data repository 236 once a user input has been received that affirmatively associates the text string with the fact type, a local device context, and/or one or more classifications associated with the fact type. For example, if a text string corresponding to an address included in semi-structured data repository 218 is displayed as an autofill candidate on a user interface, and a user selects that address to autofill for the user's home address (a classification for the address fact type), the text string may be moved from semi-structured data repository 218 to structured data repository 236 where it may be associated (e.g., in a table, with metadata, with a tag) with the address fact type and the home type classification. In another example, if a text string corresponding to a password included in semi-structured data repository 218 is displayed as an autofill candidate on a user interface for a specific webpage, application, or service, and a user selects that password to autofill for the specific webpage, application, or service (the classification for the password fact type), the text string may be moved from semi-structured data repository 218 to structured data repository 236 where it may be associated (e.g., in a table, with metadata, with a tag) with the password fact type and the specific webpage, application, or service classification. The embeddings associated with the text string in semi-structured data repository 218 may also be associated with the text string in structured data repository 236. In some examples, additional embeddings associated with the confirmed class type may also be generated and associated with the text string in structured data repository 236.

In this specific example, structured data repository 236 includes text string C 240, which is illustrated as being associated in a structured format with its fact type (fact type C 238) and one or more classifications for that fact type. Fact type C 238 also includes fact type C embeddings 242 and text string C embedding 244. Fact type C embeddings 242 may be copied from semi-structured data repository 218 when text string C 240 is moved from semi-structured data repository 218 to structured data repository 236, and fact type C embeddings 242 may also include additional embeddings associated with a confirmed class type of text string C 240.

Fact type N* 246, text string N* 248, fact type N* embeddings 250 and text string N* embedding 252 simply illustrate that there are a plurality of fact types, text inputs, and corresponding text embeddings that may be included in structured data repository 236. For example, fact type C 238 may correspond to a flight fact type with a flight number classification, and fact type N* may correspond to a hotel fact type with a hotel booking classification.

Figure 3:
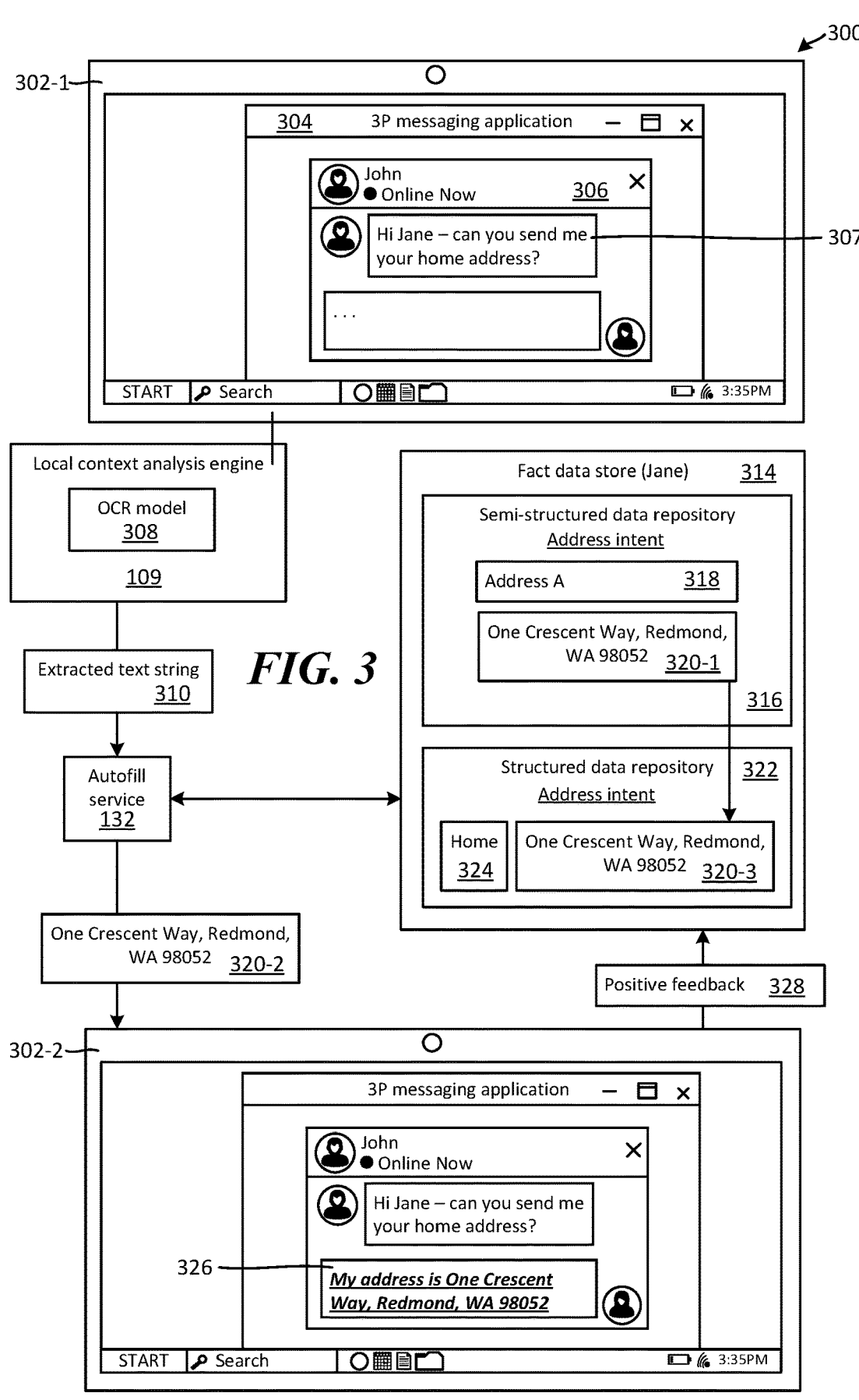
FIG. 3 is a schematic diagram illustrating an example distributed computing environment for identifying a text string candidate for autofill in relation to analyzed text and a local device context.

FIG. 3 is a schematic diagram illustrating an example distributed computing environment 300 for identifying a text string candidate for autofill in relation to analyzed text and a local device context. Distributed computing environment 300 includes local computing device 302. A user account may be associated with local computing device 302 via one or more credentials used to sign into local computing device 302, an operating system instance on local computing device 302, and/or one or more applications being executed by local computing device 302.

In this example, third party messaging application 304 is being executed and displayed on the user interface of local computing device 302-1. Because the messaging application is a third-party application (e.g., not distributed or created by the same entity that distributes the operating system), local computing device 302 may not have access to the raw text data or metadata that is sent through third party messaging application 304. That is, local computing device 302 may not have APIs that may be utilized to access the raw text data or metadata from third party messaging application 304. As such, local computing device 302 may utilize OCR model 308 of local context analysis engine 109 to analyze pixels and/or an image corresponding to messaging window 306 and message 307. Although a messaging application is illustrated in FIG. 3 to describe data from an application or surface that a local computing device and/or a cloud-based service (e.g., autofill service 132) may not have direct access to (e.g., via an API, via data sharing operations), it should be understood that text data for other applications or services may be similarly directly inaccessible to local computing devices and/or cloud-based services due to not being a first party application or service, due to user settings, and/or due to privacy concerns.

OCR model 308 may determine that message 307 includes the natural language input "Hi Jane—can you send me your home address?". This text may be extracted by local context analysis engine 109 as illustrated by extracted text string 310. Extracted text string 310 may then be sent to autofill service 132, which may process that text with one or more engines (e.g., NLP models 138, text prediction engine 140, embedding engine 142, intent determination engine 146). Autofill service 132 may determine that extracted text string 310 corresponds to an address intent type. Autofill service 132 may then determine match scores for one or more text strings in fact data store 314 that correspond to the address intent type for extracted text string 310.

Fact data store 314 is specific to the user account (e.g., Jane's user account) that is signed into local computing device 302. Fact data store 314 includes semi-structured data repository 316 and structured data repository 322. Semi-structured data repository includes first address 318 and second address 320-1. In this example, a score for second address 320-1 meets a threshold match score for the address intent type. In some examples, the score for second address 320-1 may be determined based on processing of extracted text string 310 with a natural language processing model that has been trained to classify natural language into intent type classifications and/or based on a current context on the local computing device (e.g., Jane messaging John, John being a close friend of Jane's, the "home" designation that has been determined via OCR model 308).

Based on determining that a score for second address 320 meets a threshold match score for the address intent type, autofill service causes second address 320-2 to be provided to local computing device 302-2 where it is displayed as selectable autofill candidate 326 in combination with the text "My address is", which may have been determined by text prediction engine 140. Selectable autofill candidate 326 may be displayed in a different format than other text included in messaging window 306. For example, autofill candidate 326 may be italicized, underlined, bolded, or displayed in a different color than other text in messaging window 306. Autofill candidate 326 may be selected (e.g., clicked on, a tab input received, a spacebar input received, via voice input) and converted to a text input in messaging window 306. This selection confirms that the text string is the home address for the user. As such, positive feedback 328 is provided to fact data store 314 and/or autofill service 132, and second address 320-1 is moved from semi-structured data repository 316 to structured data repository 322, as illustrated by second address 320-3. Second address 320-3 is also associated in structured data repository 322 with home classification 324.

Figure 4:
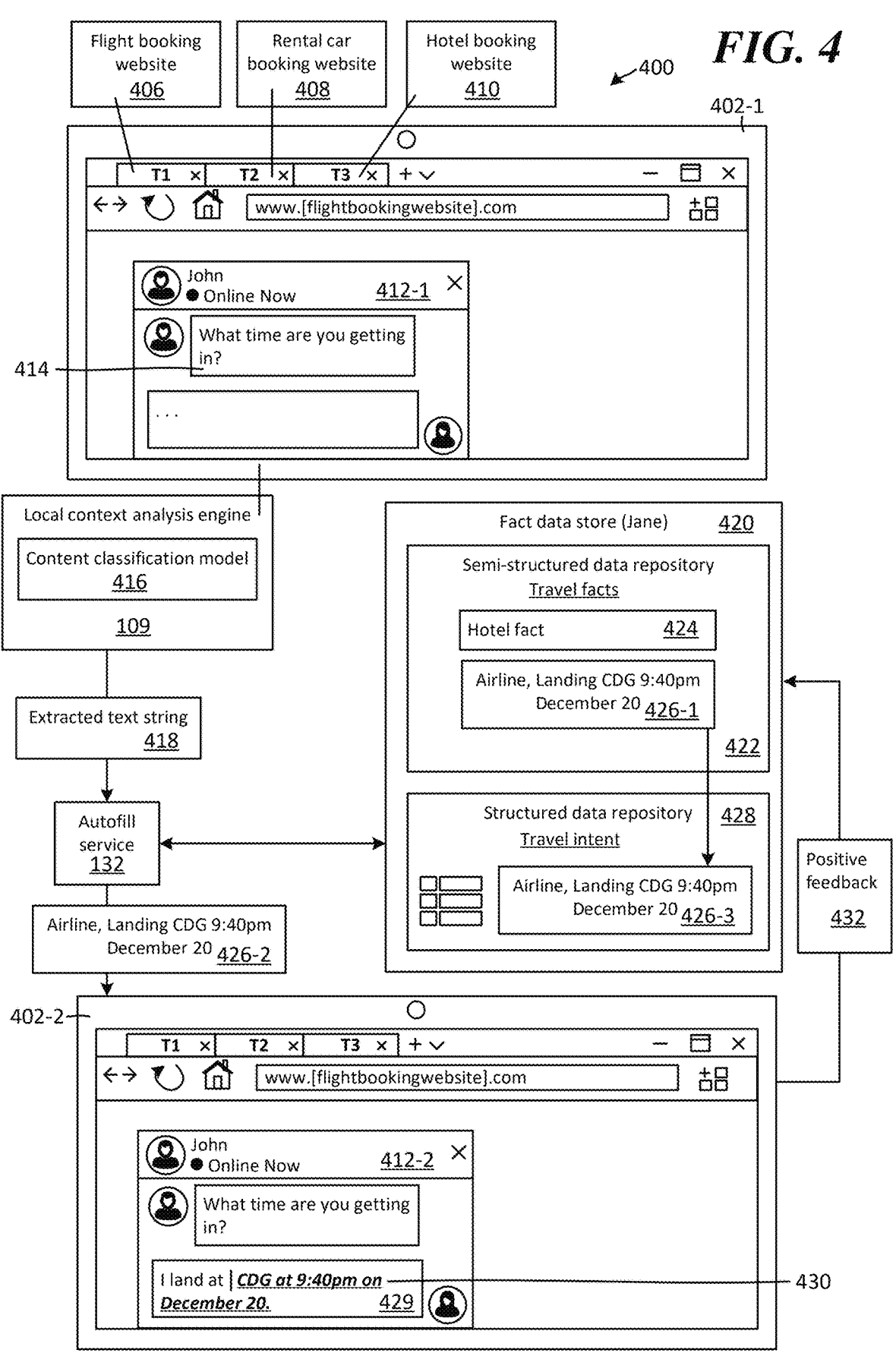
FIG. 4 is another schematic diagram illustrating an example distributed computing environment for identifying a text string candidate for autofill in relation to analyzed text and a local device context.

FIG. 4 is another schematic diagram illustrating an example distributed computing environment 400 for identifying a text string candidate for autofill in relation to analyzed text and a local device context. Distributed computing environment includes local computing device 402. A user account may be associated with local computing device 402, an operating system instance on local computing device 402, and/or one or more applications being executed by local computing device 402.

In this example a messaging application is being executed by computing device 402, and message window 412-1 with received message 414 of the messaging application are being displayed by local computing device 402. In this example, local computing device 402 and/or autofill service 132 may or may not have access to the raw text and metadata included in messages sent via the messaging application. In examples where local computing device 402 and/or autofill service 132 do not have access to the raw text and metadata, local computing device 402 may utilize OCR model 308 to analyze pixels and/or an image corresponding to message window 412 and received message 414. In examples where local computing device 402 and/or autofill service 132 do have access to the raw text and metadata, local computing device 402 and/or autofill service 132 may extract that text and metadata via one or more APIs or data sharing operations.

A user account associated with local computing device 402-1 has also recently accessed a first website (e.g., flight booking website 406) corresponding to a first tab of the displayed web browser application, a second website (e.g., rental car booking website 408) corresponding to the second tab of the displayed web browser application, and a third website (e.g., hotel booking website 410) corresponding to the third tab of the displayed web browser application. In some examples, autofill service 132 may not have access to web browser data generated by or accessed by local computing device 402-1 (e.g., due to privacy settings, due to discrete browser settings). As such, local context analysis engine 109 executed by local computing device 402-1 utilizes content classification model 416 to classify content that was recently browsed in the web browser application. Additionally, local context analysis engine 109 may utilize an OCR model to analyze and extract text that is included or inserted in one or more of the websites accessed by the user account.

In this example, the text string corresponding to message 414 ("What time are you getting in?") is extracted from message 412-1 via one or more APIs, one or more data sharing operations, or an OCR model. This is illustrated by extracted text string 418. Extracted text string 418 may then be sent to autofill service 132, which may process that text string with one or more engines and models (e.g., NLP models 138, text prediction engine 140, embedding engine 142, intent determination engine 146). Autofill service 132 may determine that extracted text string 418 corresponds to a travel intent type. In some examples, autofill service 132 may only determine that extracted text string 418 corresponds to a travel intent type based on the processing performed by content classification model 416. That is, the current context associated with local computing device 402, determined by content classification model 416, corresponding to browsing for flights, rental cars, and hotel bookings, in combination with the processing of extracted text string 418 with NLP models 138, may lead to the determination that extracted text string 418 corresponds to a travel intent type. Autofill service 132 may then determine match scores for one or more text strings in fact data store 420 that correspond to the travel intent type for extracted text string 418.

Fact data store 420 is specific to the user account (e.g., Jane's user account) that is signed into local computing device 402. Fact data store 420 includes semi-structured data repository 422 and structured data repository 428. Semi-structured data repository 422 includes first travel fact 424 (e.g., hotel fact), and second travel fact 426-1 (e.g., Airline, Landing CDG 9:40 pm December 20). In examples, first travel fact 424 may have been extracted from hotel booking website 410 during the current web browsing session on computing device 402-1, and second travel fact 426-1 may have been extracted from flight booking website 406 during the current web browsing session on computing device 402-1.

In this example, a score for second travel fact 426-1 meets a threshold match score for the travel intent type. In some examples, the score for second travel fact 426-1 may be determined based on processing of extracted text string 418 with a natural language processing model that has been trained to classify natural language into intent type classifications and/or based on a current context on the local computing device (e.g., a flight browsing context, a trip booking context). In additional examples, the score for second travel fact 426-1 may be higher because the user has typed "I land at" in window 429, which may be processed by autofill service 132 and determined to be similar to/near an embedding for second travel fact 426-1 in semi-structured data repository 422.

Based on determining that a score for second travel fact 426-1 meets a threshold match score for a travel intent type, autofill service 132 causes at least a portion of second travel fact 426-2 to be provided to local computing device 402-2 where it is displayed as selectable autofill candidate 430. Selectable autofill candidate 430 may be displayed in a different format than other text included in messaging window 412-2. For example, selectable autofill candidate 430 may be italicized, underlined, bolded, or displayed in a different color than other text in messaging window 412-2. Selectable autofill candidate 430 may be selected (e.g., clicked on, a tab input received, a spacebar input received, via voice input) and converted to a text input in messaging window 412-2. This selection confirms that the text string is a travel fact associated with the user account with a plurality of classifications (e.g., airline classification, airport classification, arrival time classification, date classification). As such, positive feedback 430 is provided to fact data store 420 and/or autofill service 132, and second travel fact 426-1 is moved from semi-structured data repository 422 to structured data repository 428, as illustrated by second travel fact 426-3. Second travel fact 426-3 is also associated in structured data repository 428 with its corresponding classifications (e.g., airline classification, airport classification, arrival time classification, date classification).

Figure 5:
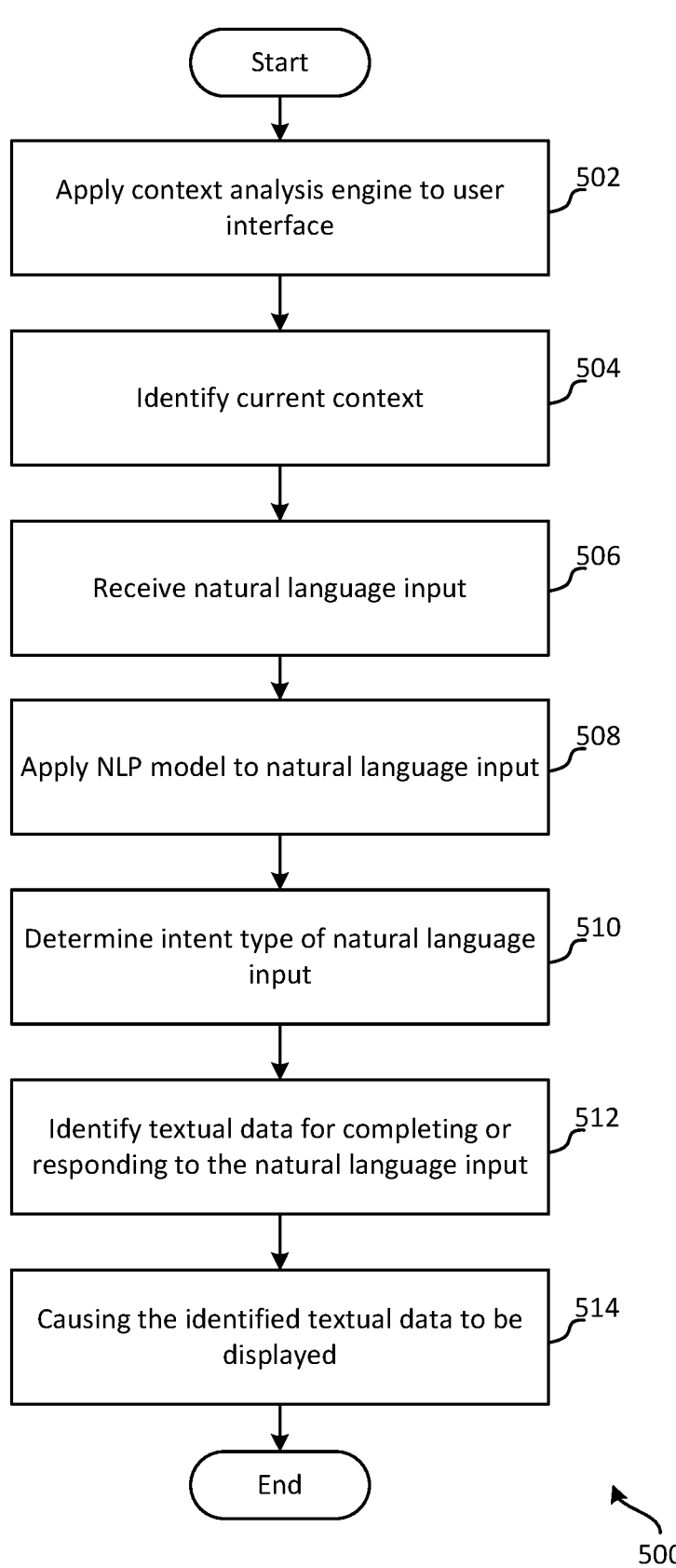
FIG. 5 is an exemplary method for identifying and displaying text data for intelligent autofill.

FIG. 5 is an exemplary method 500 for identifying and displaying text data for intelligent autofill. The method 500 begins at a start operation and flow moves to operation 502.

At operation 502 a context analysis engine is applied by a local computing device to a user interface connected to the local computing device. The context analysis engine may be applied to context data on the user interface. The context analysis engine may be applied by the local computing device due to privacy settings or concerns and/or the sensitive nature of the context data. In some examples, the context analysis engine may apply an OCR engine to image data to identify and extract underlying text. In another example, the context analysis engine may process web browser context data for a browsing session utilizing pixel and/or image data from displayed webpages. In other examples, the context analysis engine may apply one or more machine learning models (e.g., image neural networks, embedding models) to classify content included in one or more applications executed by the local computing device.

From operation 502 flow continues to operation 504 where a current context on the local computing device is identified with the context analysis engine. The current context may correspond to an intent type. For example, a current context may correspond to an insert address intent type, an insert home address intent type, an insert work address intent type, a provide password intent type, a provide streaming service password intent type, a provide specific streaming service password intent type, a provide flight number intent type, a provide flight landing type intent type, a provide flight landing time for specific flight intent type, and any other intent type that may be associated with a factual data store. In some examples, the context analysis engine may determine a score for each of a plurality of intent types, where each intent type corresponds to a current context.

From operation 504 flow continues to operation 506 where a natural language input is received by the local computing device. In some examples, the natural language input may be determined via application of the context analysis engine. For example, the natural language input may have been extracted by the OCR engine. In other examples, the natural language input may be directly extracted from an application, document, or other electronic surface. The natural language input may comprise a user input (e.g., a typed input, an active input) associated with a user account that is signed into the local computing device, or the natural language input may comprise a user input received from a different user account (e.g., a text input received in a messaging application from another user).

From operation 506 flow continues to operation 508 where a natural language processing model that has been trained to classify natural language into intent type classifications is applied to the natural language input. The natural language processing model may comprise one or more of a keyword matching model, a key phrase matching model, and/or a text embedding model. In some examples, the natural language processing model may generate a plurality of scores for the natural language input, where each score corresponds to a confidence that the natural language input matches a corresponding intent type for a fact in a factual data store associated with the user account that is logged into the local computing device or an application executed by the local computing device.

From operation 508 flow continues to operation 510 where a determination is made as to an intent type of the natural language input based on the application of the natural language processing model and the current context on the local computing device. In examples, the intent type may be determined based on a first score corresponding to the current context determined at operation 502 and a second score corresponding one or more highest ranked scores for an intent type determined at operation 506. That is, the determination as to the intent type combines the current context of the local computing device with an intent type of the natural language input.

From operation 510 flow continues to operation 512 where textual data for completing or responding to the natural language input is identified. The textual data may meet a threshold match score for the intent type, and the textual data may be identified in a factual data store associated with a user account signed into the local computing device.

From operation 512 flow continues to operation 514 where the identified textual data is caused to be displayed on the user interface of the local computing device. In some examples, the identified textual data may be displayed in a different format than the natural language input. For example, the identified textual data may be italicized, underlined, bolded, or displayed in a different color than displayed text corresponding to the natural language input.

From operation 514 flow moves to an end operation and the method 500 ends.

FIG. 6 is an exemplary method 600 for assisting with surfacing autofill text strings. The method 600 begins at a start operation and flow moves to operation 602.

At operation 602 a factual data store associated with a user account is maintained. The factual data store comprises a semi-structured data repository comprising a first plurality of text strings, and each of the plurality of text strings is associated in the semi-structured data repository with a plurality of text embeddings. The factual data store further comprises a structured data repository comprising a second plurality of text strings, and each of the second plurality of text strings is associated in the structured data repository with at least one field corresponding to a fact type. One or more classifications associated with each of the second plurality of text strings may be included in a field. Each of the second plurality of text strings may also be associated with a plurality of text embeddings.

In some examples, text strings for fact types may be manually identified and embeddings for those fact types may be generated and included in a fact type embedding matrix. Text strings associated with the user account may then be received and embeddings may be generated for those text strings such that the text strings may be associated with one or more closest manually classified intent type embeddings in the factual data store. The text strings included in the semi-structured database may correspond to facts extracted from user data, but those facts may not have been confirmed and/or associated with one or more classifications or fields. The text strings included in the structured data repository may also correspond to facts extracted from user data, but those facts may have been confirmed and/or associated with one or more classifications and fields.

From operation 602 flow continues to operation 604 where an intent type associated with a text input received from a local computing device is determined. The intent type may be determined based on processing of the text input with one or more natural language processing models (e.g., natural language processing models 138). In additional examples, the intent type may be determined based on processing of the text input with one or more natural language processing models and a context of the local computing device determined by a context analysis engine (e.g., context analysis engine 134, context analysis engine 109)

From operation 604 flow continues to operation 606 where a match score between the intent type and a text string of the first plurality of text strings in the semi-structured data repository is determined. In some examples, the match score may be determined based at least in part on a similarity between an embedding generated for the text input and one or more embeddings included in the semi-structured data repository.

From operation 606 flow continues to operation 608 where a determination is made that the match score meets a threshold value.

From operation 608 flow continues to operation 610 where the text string is caused to be displayed by the local computing device. In some examples, the text string may be displayed in a different format than a format that the text input is displayed on the local computing device. For example, the text string may be italicized, underlined, bolded, or displayed in a different color than displayed text corresponding to the natural language input.

From operation 610 flow continues to operation 612 where a determination is made that the text string has been selected. The selection may comprise a tab input, a spacebar input, a touch input, a mouse click, or a voice input, for example.

From operation 612 flow continues to operation 614 where the text string is written to the structured data repository. That is, the fact corresponding to the text string is confirmed via the user selection and the text string may thus be associated with one or more classifications and/or fields in the structured data repository.

From operation 614 flow continues to an end operation and the method 600 ends.

Figure 7:
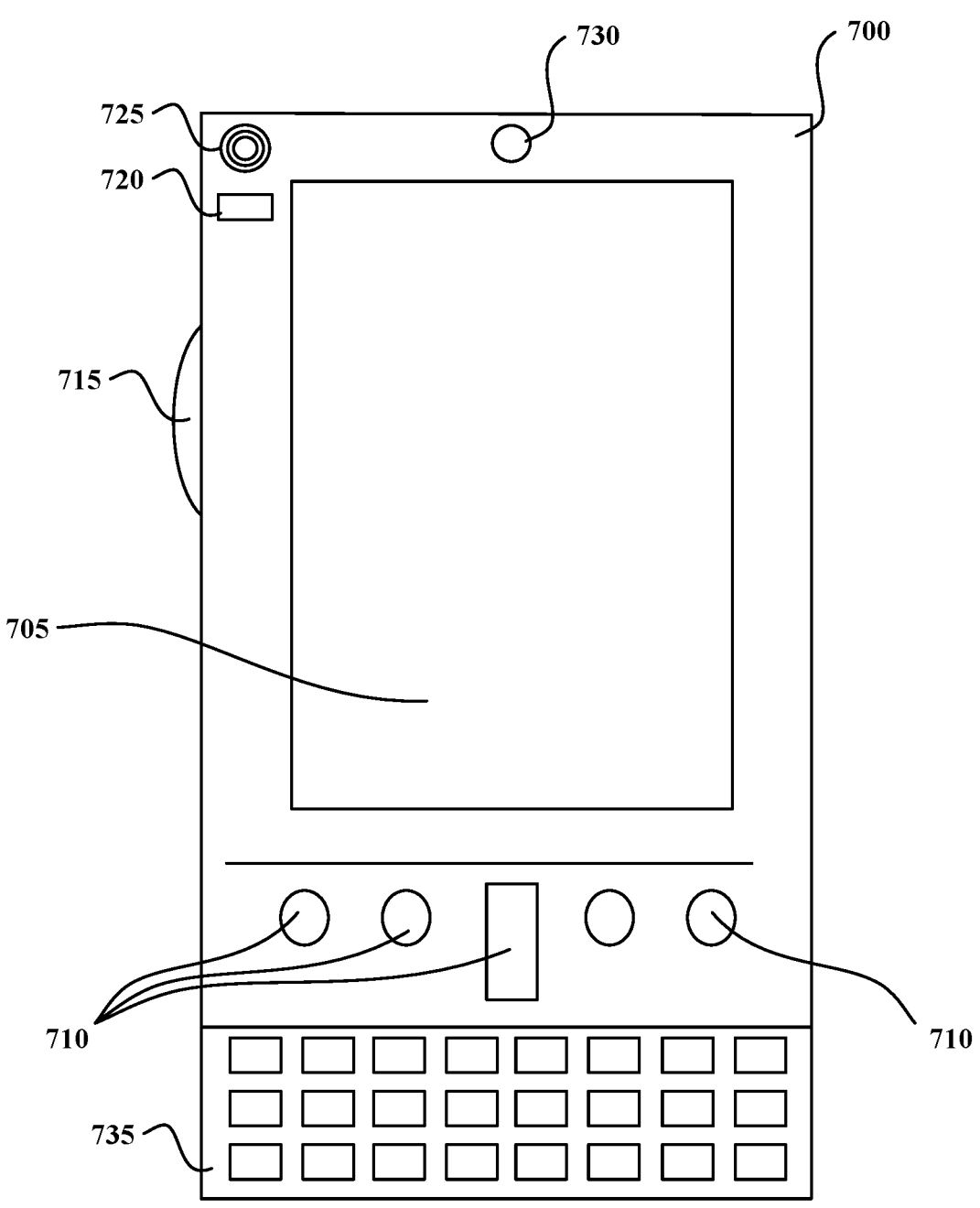
FIGS. 7 and 8 are simplified diagrams of a mobile computing device with which aspects of the disclosure may be practiced.
Figure 8:
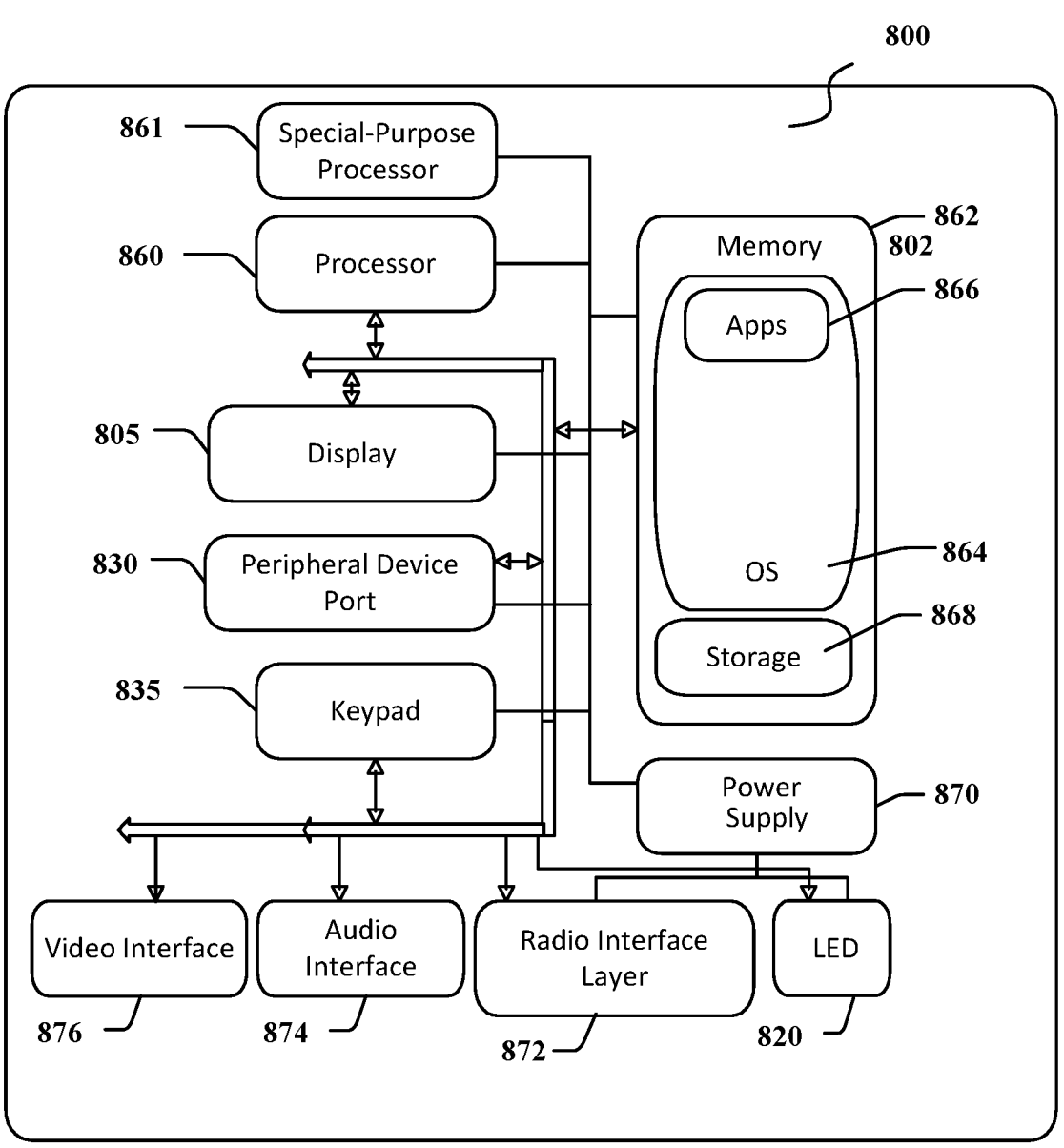

FIGS. 7 and 8 illustrate a mobile computing device 700, for example, a mobile telephone, a smart phone, wearable computer, a tablet computer, an e-reader, a laptop computer, and an augmented reality computer, with which embodiments of the disclosure may be practiced. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or fewer input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 620 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including instructions for identifying a target value in a data set.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 720 may be used to provide visual notifications, and/or an audio interface 874 may be used for producing audible notifications via the audio transducer 725. In the illustrated embodiment, the visual indicator 720 is a light emitting diode (LED) and the audio transducer 725 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 730 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
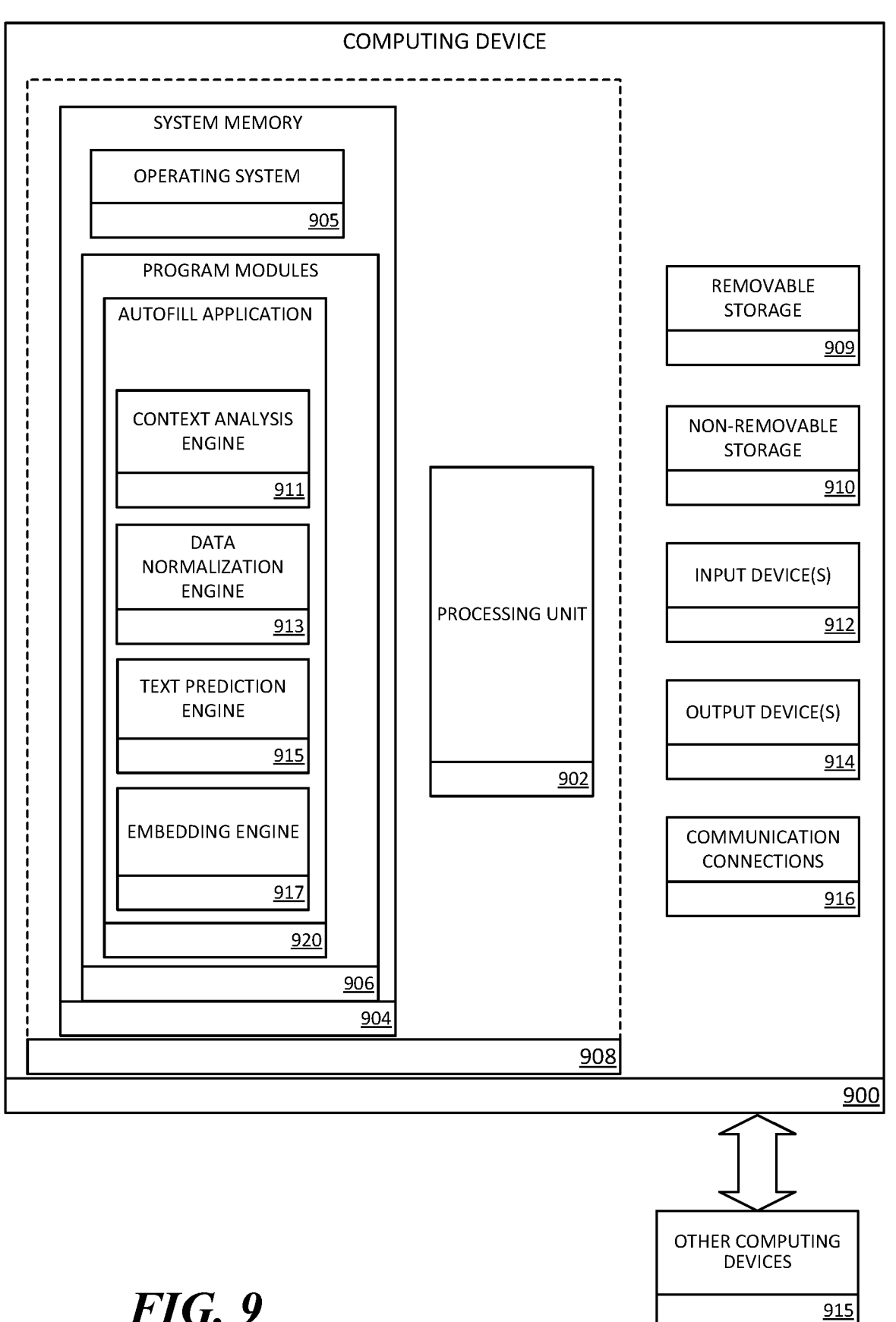
FIG. 9 is a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may have computer executable instructions for classifying text strings, augmenting text strings, and identified classified text strings for intelligent autofill. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 suitable for running one or more productivity application programs. The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., autofill application 920) may perform processes including, but not limited to, the aspects, as described herein. According to examples, context analysis engine 911 may perform operations associated with determining a context type associated with a local computing device. Data normalization engine 913 perform operations associated with receiving data from many different sources and in many different formats and normalizing it to a single format and/or file. Text prediction engine 915 may perform operations associated with determining text candidates for surfacing alone or in combination with facts/text strings included in a factual data store. Embedding engine 917 may perform operations associated with generating embeddings for text strings.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 915. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal. Computer storage device does not include a carrier wave or other propagated or modulated data signal. Computer-readable storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10:
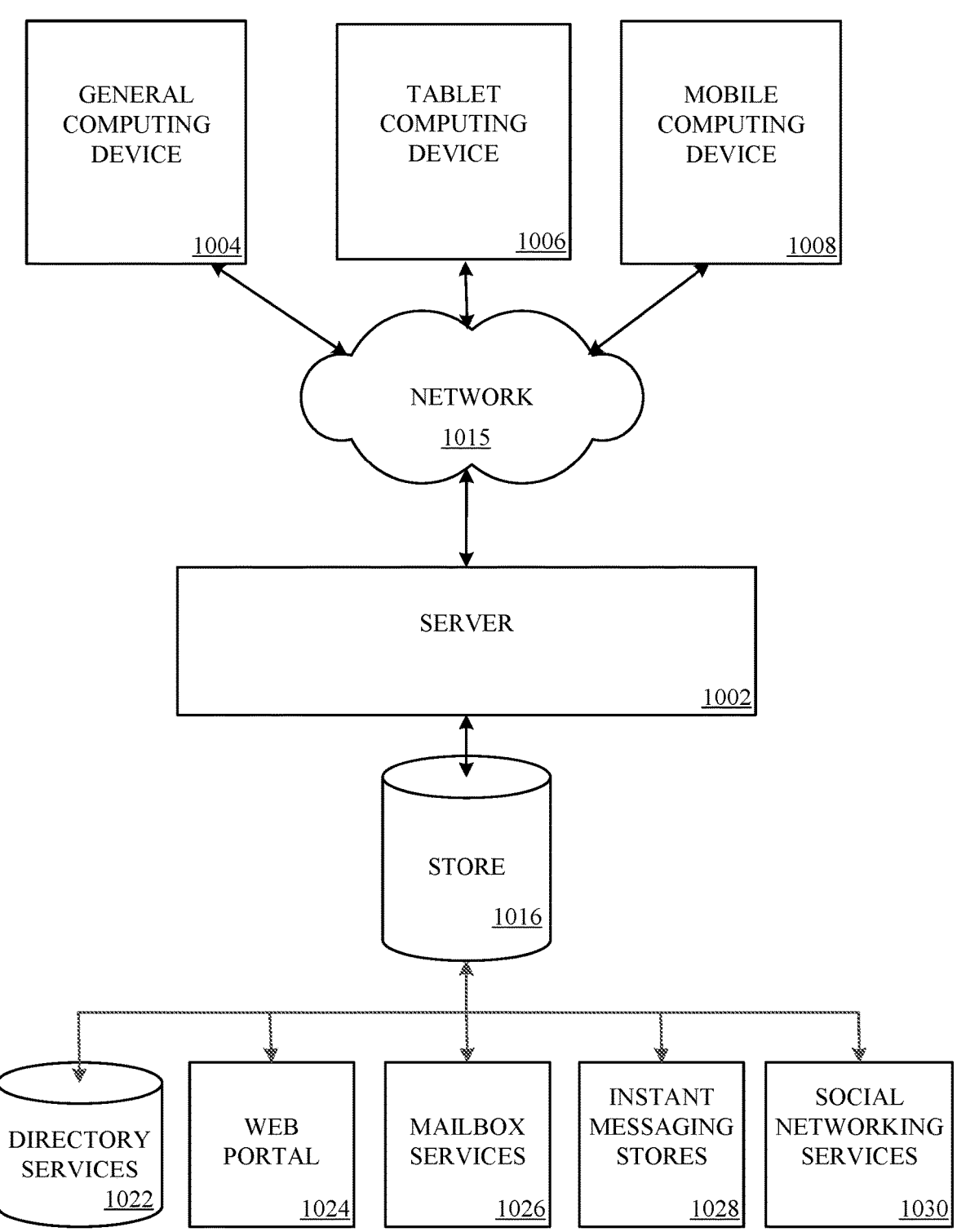
FIG. 10 is a simplified block diagram of a distributed computing system in which aspects of the present disclosure may be practiced.

FIG. 10 illustrates one aspect of the architecture of a system for processing data received at a computing system from a remote source, such as a personal/general computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. The program modules 1006 may be employed by a client that communicates with server device 1002, and/or the program modules 1006 may be employed by server device 1002. The server device 1002 may provide data to and from a client computing device such as a personal/general computer 1004, a tablet computing device 1006 and/or a mobile computing device 1008 (e.g., a smart phone) through a network 1015. By way of example, the computer system described above with respect to FIGS. 7-9 may be embodied in a personal/general computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A computer-implemented method comprising:

applying, by a local computing device, a context analysis engine to a user interface of the local computing device;

identifying, with the context analysis engine, a current context on the local computing device based at least in part on context data that provides an indication of an activity that a user is engaging in via a first application on the local computing device;

receiving, on the local computing device, a natural language input via a second application;

applying a natural language processing model that has been trained to classify natural language into intent type classifications to the natural language input;

determining, based on the application of the natural language processing model and the current context on the local computing device, an intent type of the natural language input;

identifying textual data corresponding to the natural language input that meets a threshold match score for the intent type, wherein the textual data is identified in a factual data store associated with a user account signed into the local computing device; and causing the identified textual data to be displayed as a selectable autofill candidate on the user interface of the local computing device.

2. The computer-implemented method of claim 1, further comprising:

identifying, by the local computing device, an application type associated with an open application window on the local computing device;

and wherein the context analysis engine applied to the user interface is specific to the identified application type and selected from a plurality of context analysis engines.

3. The computer-implemented method of claim 1, wherein the factual data store comprises:

an unstructured data repository comprising data that has not been classified into a fact type;

a semi-structured data repository comprising data that has been classified into a fact type; and a structured data repository comprising data that has been classified into a fact type and associated as belonging to at least one user account.

4. The computer-implemented method of claim 3, wherein the textual data corresponding to the natural language input is identified from the semi-structured data repository.

5. The computer-implemented method of claim 4, further comprising:

receiving an interaction with the displayed identified textual data;

causing the identified textual data to complete the natural language input;

deleting the identified textual data from the semi-structured data repository; and writing the identified textual data to the structured data repository.

6. The computer-implemented method of claim 3, wherein the data in the semi-structured data repository comprises text embeddings for each of a plurality of identified facts.

7. The computer-implemented method of claim 3, wherein the data in the structured data repository comprises a plurality of identified facts, each of the plurality of identified facts associated in the structured data repository with at least one field for a corresponding fact type.

8. The computer-implemented method of claim 1, wherein:

the context analysis engine comprises a web content classification model that has been trained to classify content in web browser applications;

the identified current context comprises one of a travel context and a password context; and the identified textual data comprises a travel fact or a password fact.

9. The computer-implemented method of claim 1, wherein the local computing device does not have access to raw text data of the second application, the method further comprising:

analyzing, with an optical character recognition model, an image of a user interface of the second application to extract the natural language input.

10. The computer-implemented method of claim 1, wherein the context analysis engine is applied by the local computing device upon determining that the local computing device does not have access to metadata associated with received content in a messaging application being executed by the local computing device.

11. A system comprising:

a memory for storing executable program code; and a processor, functionally coupled to the memory, the processor being responsive to computer-executable instructions contained in the program code and operative to:

apply, by a local computing device, a context analysis engine to a user interface of the local computing device;

identify, with the context analysis engine, a current context on the local computing device based at least in part on context data that provides an indication of an activity that a user is engaging in via a first application on the local computing device;

receive, by the local computing device, a natural language input via a second application;

apply a natural language processing model that has been trained to classify natural language into intent type classifications to the natural language input;

determine, based on the application of the natural language processing model and the current context on the local computing device, an intent type of the natural language input;

identify textual data corresponding to the natural language input that meets a threshold match score for the intent type, wherein the textual data is identified in a factual data store associated with a user account signed into the local computing device; and cause the identified textual data to be displayed as a selectable autofill candidate on the user interface of the local computing device.

12. The system of claim 11, wherein the processor is further responsive to the computer-executable instructions contained in the program code and operative to:

identify, by the local computing device, an application type associated with an open application window on the local computing device;

and wherein the context analysis engine applied to the user interface is specific to the identified application type and selected from a plurality of context analysis engines.

13. The system of claim 11, wherein the factual data store comprises:

an unstructured data repository comprising data that has not been classified into a fact type;

a semi-structured data repository comprising data that has been classified into a fact type; and a structured data repository comprising data that has been classified into a fact type and associated as belonging to at least one user account.

14. The system of claim 13, wherein the textual data for completing or responding to the natural language input is identified from the semi-structured data repository.

15. A computer-readable storage device comprising executable instructions that, when executed by a processor, assist with surfacing autofill text strings, the computer-readable storage device including instructions executable by the processor for:

maintaining a factual data store associated with a user account, wherein the factual data store comprises:

a semi-structured data repository comprising a first plurality of text strings, wherein each of the first plurality of text strings is associated in the semi-structured data repository with a plurality of text embeddings, and a structured data repository comprising a second plurality of text strings, wherein each of the second plurality of text strings is associated in the structured data repository with at least one field corresponding to a fact type;

determining an intent type associated with a text input received via a second application executing on a local computing device;

identifying a current context on the local computing device based at least in part on context data that provides an indication of an activity that a user is engaging in via a first application executing on the local computing device;

determining a match score between the intent type and a text string of the first plurality of text strings in the semi-structured data repository;

determining that the match score meets a threshold value;

causing the text string to be displayed by the local computing device;

determining that the text string has been selected; and writing the text string to the structured data repository.

16. The system of claim 14, wherein the processor is further responsive to the computer-executable instructions contained in the program code and operative to:

receive an interaction with the displayed identified textual data;

cause the identified textual data to complete the natural language input;

delete the identified textual data from the semi-structured data repository; and write the identified textual data to the structured data repository.

17. The system of claim 13, wherein the data in the semi-structured data repository comprises text embeddings for each of a plurality of identified facts.

18. The system of claim 13, wherein the data in the structured data repository comprises a plurality of identified facts, each of the plurality of identified facts associated in the structured data repository with at least one field for a corresponding fact type.

19. The system of claim 11, wherein:

the context analysis engine comprises a web content classification model that has been trained to classify content in web browser applications;

the identified current context comprises one of a travel context and a password context; and the identified textual data comprises a travel fact or a password fact.

20. The system of claim 11, wherein:

the local computing device does not have access to raw text data of the second application; and the processor is further operative to:

analyze, with an optical character recognition model, an image of a user interface of the second application to extract the natural language input.

\* \* \* \* \*